United States Patent [19]
Morandi et al.

[11] 3,901,166
[45] Aug. 26, 1975

[54] TRANSFER WHEEL FOR TRANSFERRING ARTICLES IN A PACKAGING DEVICE
[75] Inventors: Armand Morandi; Jacques Berga, both of Renens, Switzerland
[73] Assignee: SAPAL Societe Anonyme des Plieuses Automatiques, Ecublens, Switzerland
[22] Filed: Dec. 28, 1973
[21] Appl. No.: 429,663

[30] Foreign Application Priority Data
May 8, 1973  Switzerland.......................... 6250/73

[52] U.S. Cl. .................... 198/25; 198/211; 198/242
[51] Int. Cl.² ......................................... B65G 47/00
[58] Field of Search ............. 198/25, 211, 212, 242, 198/243

[56] References Cited
UNITED STATES PATENTS
2,645,326   7/1953   Kerr...................................... 198/25

FOREIGN PATENTS OR APPLICATIONS
414,061   7/1934   United Kingdom................. 198/212

Primary Examiner—Evon C. Blunk
Assistant Examiner—Douglas D. Watts
Attorney, Agent, or Firm—Stevens, Davis, Miller & Mosher

[57] ABSTRACT

A transfer wheel comprises a plurality of pivotally mounted pallets whose angular inclinations are controlled during rotation of the wheel by toggles each having a roller guided along a fixed path by a cam. Each pallet moves from a horizontal position at which it takes up a horizontally disposed flat product to a vertical position at which it delivers the vertically disposed product in a horizontal direction, the pallet moving horizontally with the product over a short path and then retracting into a wheel.

1 Claim, 4 Drawing Figures

TRANSFER WHEEL FOR TRANSFERRING ARTICLES IN A PACKAGING DEVICE

The invention relates to transfer wheels for transferring generally flat articles in a packaging device.

According to the invention, there is provided, in a packaging device, a continuously rotating transfer wheel comprising a plurality of pallets disposed at regular intervals about the periphery of the wheel for pivotal movement about axes parallel to the axis of rotation of the wheel, and means for controlling the inclination of the pallets relative to the wheel during rotation of the wheel to a protruding position for individually taking up flat articles delivered edgewise at a first angular location and for individually transferring the articles facewise along a fixed direction perpendicular to the faces of the articles to a grouping device at a second angular location, the pallets accompanying the articles over a certain distance along or substantially along said fixed direction up to said second angular location, and to retract into the wheel during part of each revolution from the second angular location towards the first angular location.

The accompanying drawings show, by way of example, an embodiment of the transfer wheel according to the invention and a machine incorporating this wheel.

Figure 1:
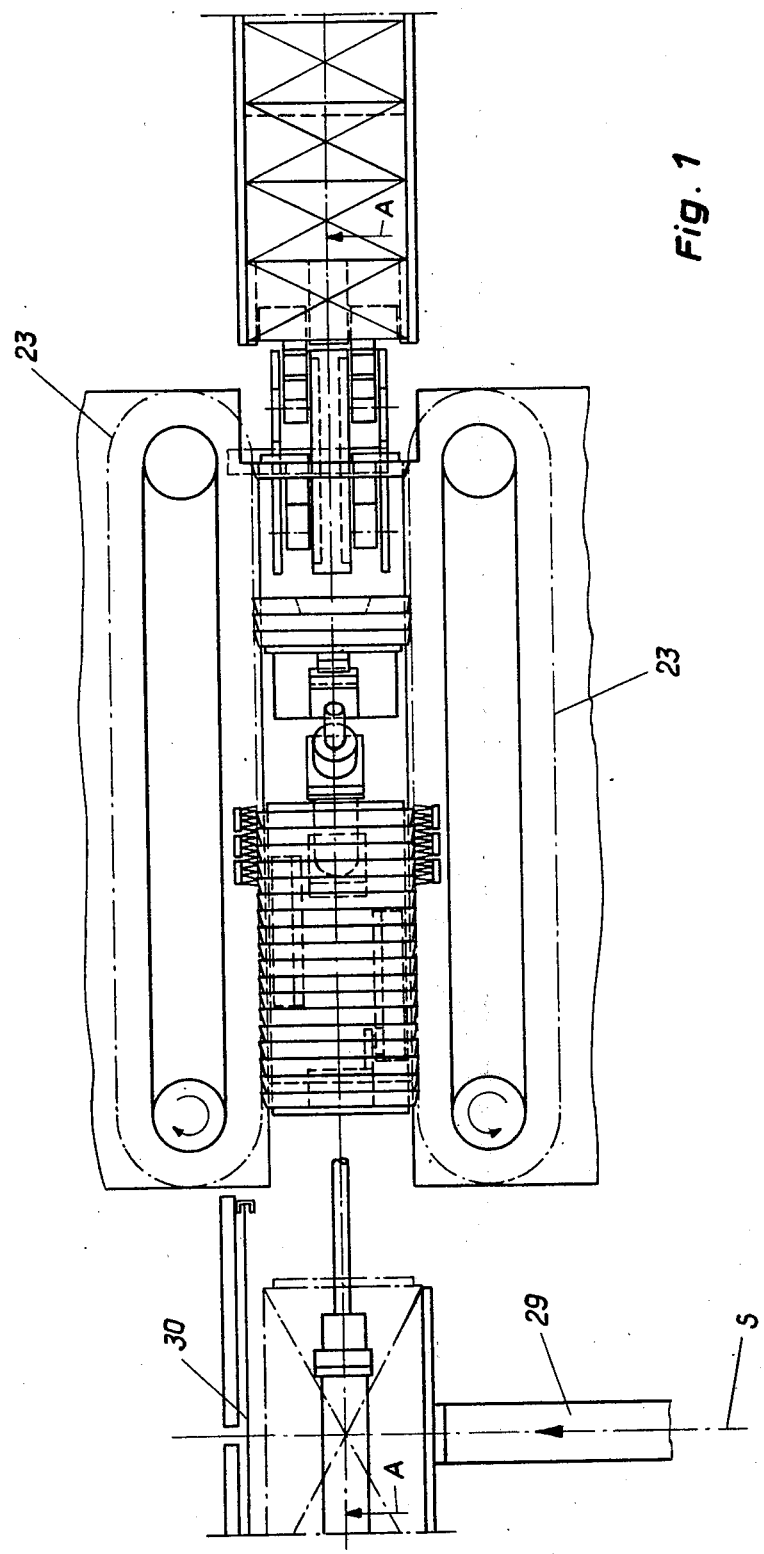
FIG. 1 is a plan view of the machine.

The transfer wheel (FIGS. 3 and 4) includes a pair of support discs 1 keyed on a shaft 9 adapted to be continuously rotated, possibly at variable speed. Towards their periphery, discs 1 carry pallets 2 each including a plate perpendicular to disc 1 and a plate parallel to disc 1, the latter plate being (a) pivotally mounted about a pivot 5 fixed towards the periphery of a disc 1 and (b) pivotally connected about a shaft 8 to one arm 4 of a toggle, the other arm 3 of which is pivotally mounted on a pivot 6 perpendicular to disc 1. Arms 3 and 4 of the toggle are pivotally connected about a shaft 7 carrying a roller 11.

Fixed cams 12, disposed between discs 1 guide rollers 11 along a path 10 described by the axes of shafts 7 so that during rotation of discs 1, the arms 3 and 4 of the toggle pivot and control the inclination of pallets 2 about their pivots 5.

During rotation of discs 1, pairs of pallets 2 arrive in a vertical position M and continue to move forward in a vertical orientation over a distance of 25 mm up to point K. Then pallets 2 retract upon moving past point K, i.e. the top of the pallets tilt over towards the right (looking at FIG. 4) until they are disposed within the outer periphery of discs 1.

Once the tops of pallets 2 have passed by point K, they progressively move out again to reach a horizontal position at point P, the location for taking up a flat product, i.e. after a rotation of 270° of discs 1 from point M. Delivery of the flat products onto horizontal pallets at point P takes place with the products horizontal and disposed edge-to-edge whereas the products transferred in a horizontal direction from points M and K are disposed vertically and face-to-face.

Figure 2:
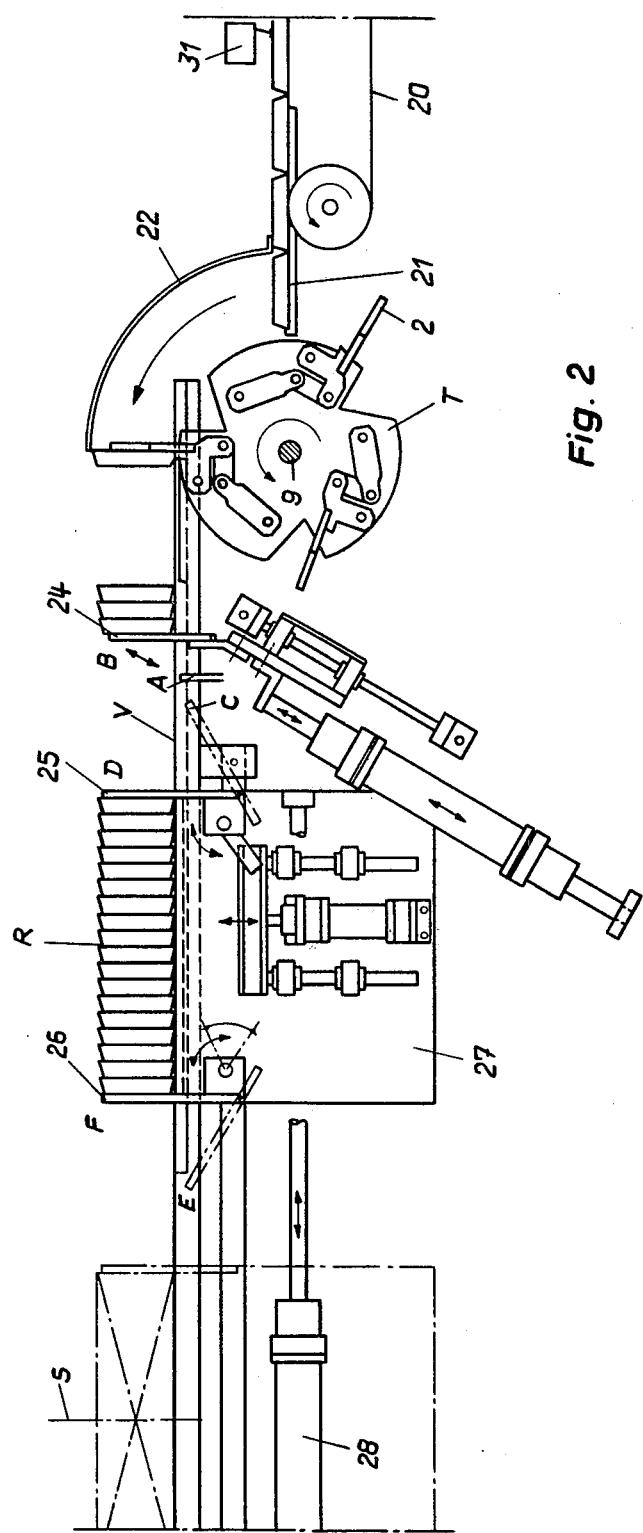
FIG. 2 is a cross-section taken along line A—A of FIG. 1.
Figure 3:
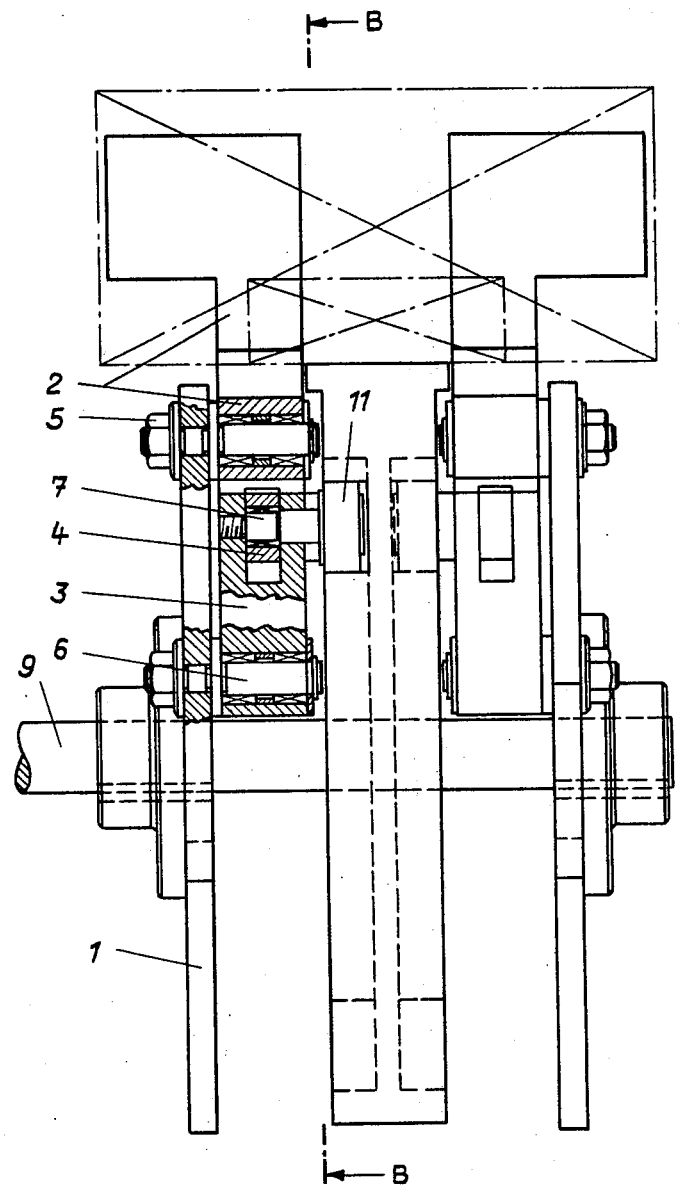
FIG. 3 is a view, partially in cross-section, of the transfer wheel.
Figure 4:
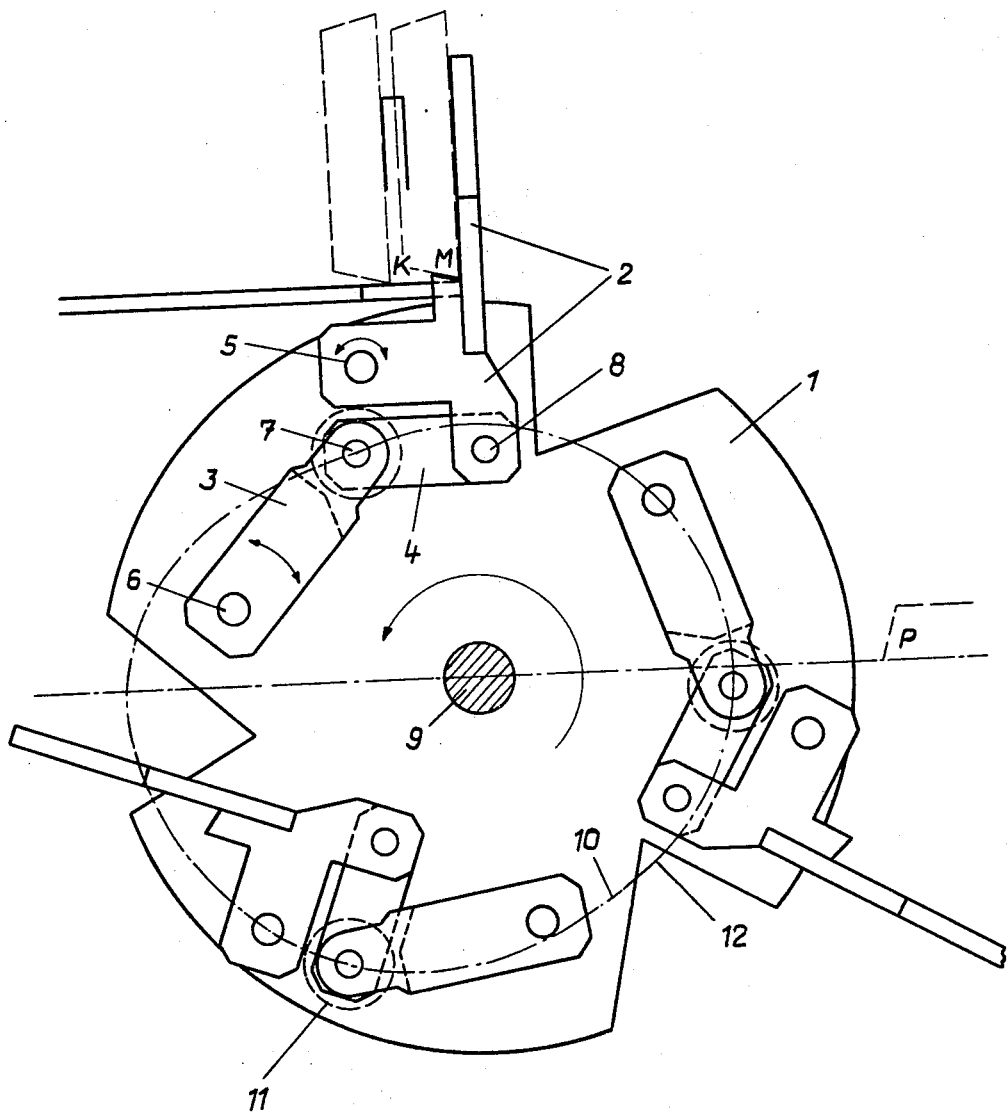
FIG. 4 is a cross-section taken along ling B—B of FIG. 3.

The machine shown in FIGS. 1 and 2 carries the transfer wheel of FIGS. 3 and 4 at its right.

Wrapped, generally flat products or tablets are conveyed from a wrapping device to the transfer wheel T by a continuously rotating belt 20 on which operations of control and ejection of non-conforming products are carried out by known means.

A switch (not shown) can be adjusted in the direction of advance of the tablets and enables detection of a lack of tablets; by adjustment thereof, it is possible to set the length of the waiting line. The switch controls stoppinng of the transfer of tablets to wheel T and by setting the time delay of the switch, it detects only spaces of a certain size between the tablets.

Belt 20 is extended by a bridge 21 for delivering the horizontal tablets to pallets 2, the tablets abutting on this bridge and resting until they are taken up by the pallets 2 of wheel T. An arcuate deflector 22 prevents a tablet taken up by a pair of pallets from leaving it under the effect of centrifugal force. Deflector 22 has a horizontal rearwardly protruding edge which prevents the second tablet of the waiting line from being driven by a tablet taken up by a pair of pallets 2. Once a tablet is transferred to the vertical position it is immediately engaged between and driven by turning brushes 23 mounted on endless belts.

At the beginning of a cycle, a pushing pallet 24 is in position A, pallet 25 in position C and pallet 26 in a vertical position F. Because of this, the tablets driven by brushes 23 will be held by the pallet 26.

When a desired number of tablets has passed by point V, the pushing pallet 24 moves from position A to position B and driving pallet 25 pivots from position C to position D, the pallet 26 being at rest in position F.

The group of products thus formed in conveyed by means of a carriage 27 driven by jack 28, up to an axis S where by means of a transverse pusher 29, the tablets are moved from carriage 27 directly into a cardboard blank 30 serving for packaging the group of tablets, and where folding and cutting operations are carried out.

As soon as pusher 29 has removed the tablets from carriage 27, the pallets 25 and 26 move to positions C and E and carriage 27 returns to axis R. When the carriage 27 is in place, pallet 26 lifts up to position F and pusher pallet 24 moves down toposition A, thus enabling tablets which have accumulated behind pallet 24 to be driven by the turning brushes 23 into carriage 27.

What we claim is:

1. In a packaging device, a continuously rotatable transfer assembly, comprising a disc, a shaft mounting said disc for rotation, a plurality of pallets disposed about the periphery of said disc for pivotal movement about axes parallel to the axis of rotation of the shaft, toggles, said pallets being mounted on first pivots fixed on the disc towards the periphery thereof, each pallet being also pivotally connected to an arm of one of said toggles, the other arm of which is pivotally mounted on a second pivot fixed to the disc and parallel to the axis of said first shaft, each toggle being at its point of articulation pivotally connected about a second shaft carrying a cam follower fixed thereto, and a fixed cam in the path of said cam follower, the contour of said cam being such that during rotation of the disc, the toggle pivots and controls the inclination of the pallets relative to the disc during rotation thereof to a protruding position for individually taking up flat articles delivered edgewise at a first angular location and for individually transferring the articles facewise along a fixed direction perpendicular to the faces of the articles to a grouping device at a second angular location, the pallets accompanying the articles over a certain distance along said fixed direction up to said second angular location and to retract into the disc during part of each revolution from the second angular location towards the first angular location.

* * * * *